United States Patent
To et al.

(10) Patent No.: US 6,499,420 B1
(45) Date of Patent: Dec. 31, 2002

(54) PNEUMATIC FLOAT FOR LIGHT AND ULTRALIGHT AIRCRAFT

(75) Inventors: Frederick E. To, Northampton (GB); Res Kammer, Rubigen (CH)

(73) Assignee: Prospective Concepts AG, Zollikon (CH)

( * ) Notice: Subject to any disclaimer, the term of this patent is extended or adjusted under 35 U.S.C. 154(b) by 371 days.

(21) Appl. No.: 10/009,538

(22) PCT Filed: Jul. 13, 2000

(86) PCT No.: PCT/CH00/00383

§ 371 (c)(1),
(2), (4) Date: Nov. 30, 2001

(87) PCT Pub. No.: WO01/36268

PCT Pub. Date: May 25, 2001

(30) Foreign Application Priority Data

May 10, 2000 (CH) .............................. 0911/00

(51) Int. Cl.$^7$ ................................. B63B 1/00
(52) U.S. Cl. ..................................... 114/292
(58) Field of Search ............... 114/345, 61.1, 114/123, 283, 292; 244/101, 105, 108, 100 A

(56) References Cited

U.S. PATENT DOCUMENTS

| | | | |
|---|---|---|---|
| 2,345,143 A | 3/1944 | Nakagawa | 244/102 |
| 2,391,326 A | 12/1945 | McKinley | 114/66.5 |
| 2,396,212 A | * 3/1946 | Spanel | 114/345 |
| 2,494,316 A | * 1/1950 | Sanderson | 114/292 |
| 2,522,340 A | 9/1950 | Braden et al. | 244/105 |
| 3,095,846 A | * 7/1963 | Beamish | 114/292 |
| 3,154,270 A | 10/1964 | Jensen | 244/101 |
| 4,233,102 A | 11/1980 | Fisher | 156/292 |
| 4,697,762 A | 10/1987 | Arney | 244/101 |
| 5,732,650 A | 3/1998 | Peterson | 114/345 |
| 6,227,250 B1 | * 5/2001 | Coutarel | 138/129 |

FOREIGN PATENT DOCUMENTS

| | | |
|---|---|---|
| DE | 600321 | 7/1934 |
| WO | WO 98/03398 | 1/1998 |

* cited by examiner

*Primary Examiner*—Stephen Avila
(74) *Attorney, Agent, or Firm*—Jenkens & Gilchrist, PC.

(57) ABSTRACT

The pneumatic float according to the invention comprises an airtight outer skin (5), which can be inflated with compressed air via a valve (21). Webs (6) extend essentially over the entire length of the float, which are joined to the outer skin (5) along the lines (1) and on the one hand divide the inside of the float into intercommunicating chambers (7), and on the other hand give the float the desired contours (14), stability and stability against bending. The webs can comprise single or multiple layers of low-stretch woven material or plastics material foils. To improve directional stability in operation and as a protection against damage to the outer skin (5) the float has a keel rail (8), for instance comprising plastics material, and glued on. To avoid the Coanda effect two side rails (9) are attached in a similar manner.

23 Claims, 2 Drawing Sheets

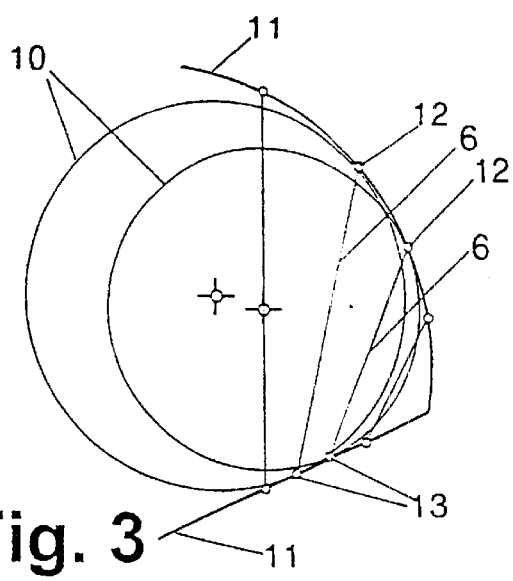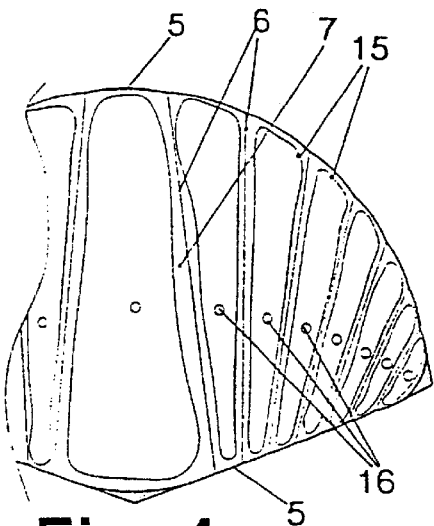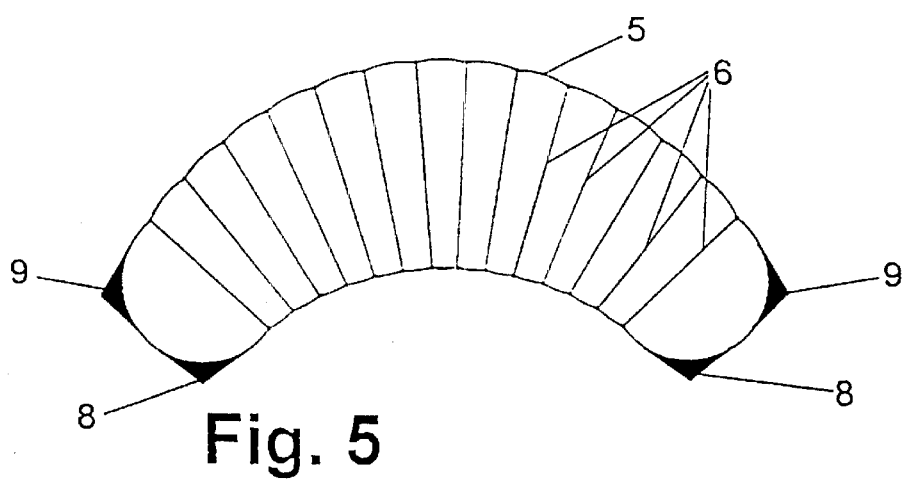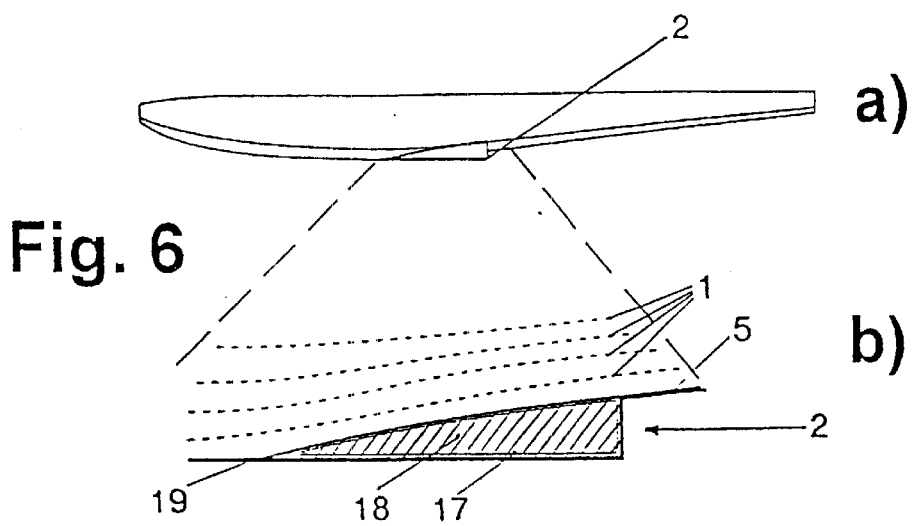

PNEUMATIC FLOAT FOR LIGHT AND ULTRALIGHT AIRCRAFT

Figure 1:
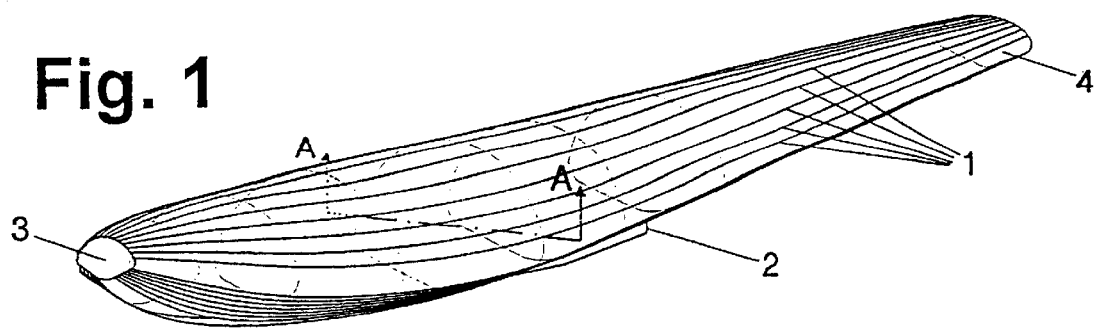

The present invention relates to a pneumatic float for light and ultra-light aircraft in accordance with the preamble to claim 1.

Several such pneumatic floats, that is inflated with compressed air, are known. The closest to the present invention, representing the state of the technology, are for instance published in U.S. Pat. No. 4,697,762 (D1), U.S. Pat. No. 2,391,326 (D2), U.S. Pat. No. 2,522,340 (D3) and U.S. Pat. No. 2,345,143 (D4). Whilst in D2, D3, and D4 the general state of the technology is limited, D1 lies closest to the present invention. A float is published in D1, which comprises a flexible outer hull of strong woven fabric, which is constructed from an upper side, a lower side and side walls. The upper and lower sides are joined by a number of similarly textile webs built in essentially vertically and along the main direction of the float. At a position somewhat to the rear of the centre the float has a step, which was published in DE 600 321 as early as 1933 and has been applied and further developed since then.

In the cross section through the float in D1 at the position of this quoted step, similarly an essentially vertical web is built in, however perpendicular to the main direction of the float. In the chambers, which are formed between the webs and between the webs and the side walls, airtight bladders are inserted, which are inflated with compressed air and provide the float on the one hand with the necessary buoyancy and on the other hand a certain stability.

To increase the stability and rigidity, stiffening elements are built into the region in front of the step mentioned, which are provided partly of rigid foam, partly of plywood. A shoe is fastened on the outside of the fabric-constructed float, which additionally stiffens the underside of the forward part and is to protect the float from damage. This shoe is made, for instance from plastics material.

The introduction of force from the undercarriage of the aircraft onto the two floats constructed as described occurs via two spars running longitudinally over the entire length of each float. These lie to the side on top of the floats and are lashed and fastened by long lashings. The total of four spars are joined by two transverse spars on which the aircraft is supported, whereby the rear transverse spar lies somewhat in the position where the underside of the float has the step mentioned.

If one takes the intended area of application of the float according to D1 into account, then the major advantage claimed is weight conservation. Since the selected method of construction of the purely pneumatic part of the float has, however, insufficient stiffness, all sorts of measures have to be provided for its increase, which are not pneumatic, and therefore heavier, in part indeed substantially heavier, than air or purely pneumatic components. Furthermore at the height of the step the longitudinal webs are interrupted by the transverse web. Owing to the introduction of force at the rear transverse spar also lying at about this point there results in this region a joint-like weakening of the float in one of the constructions claimed in D1 which has to be strengthened and tensioned by a compression leg passing vertically through the float and two wire ropes.

It is also not obvious from D1, how other cross section forms—for instance such as those with a V-shaped bottom part—can be constructed in accordance with the invention. From the chosen construction it can be at least anticipated that, in addition to the disadvantages mentioned, the float according to D1 also cannot be economically manufactured.

It is therefore the aim of the present invention to produce pneumatic floats for light and ultra-light aircraft, which overcome the stated disadvantages, which are light and rigid and can also be manufactured cost-effectively.

Figure 2:
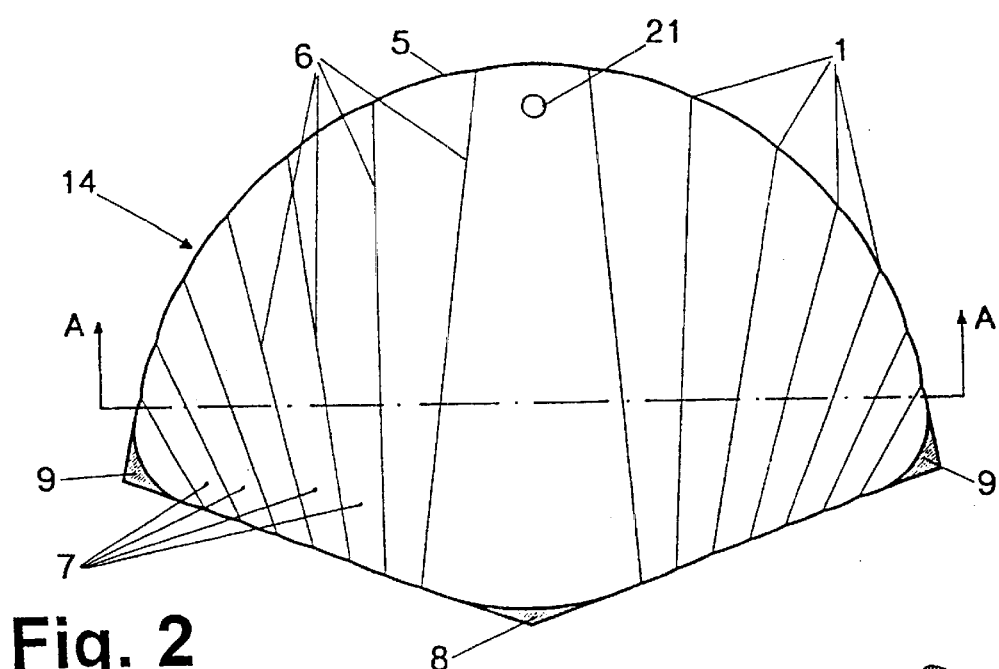
Figure 7:
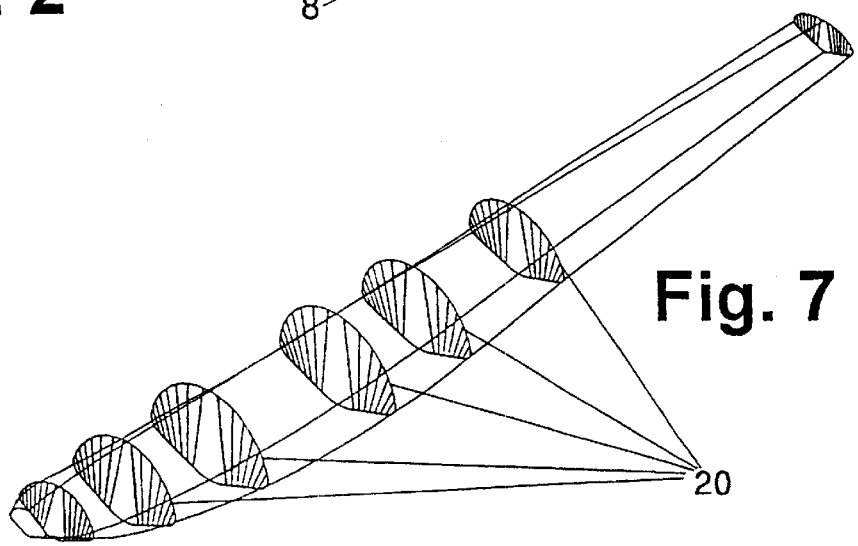

The addressing of the stated aim is reproduced in claim 1 as regards its essential features, in the following claims with regard to further advantageous embodiments. The invention is more closely described using the attached drawing. Shown are:

FIG. 1 a perspective view of a first embodiment,
FIG. 2 a cross section through the first embodiment,
FIG. 3 a constructional detail from FIG. 2,
FIG. 4 a supplement to FIG. 2, according to the invention,
FIG. 5 a section through a second embodiment,
FIG. 6a a side view of the first embodiment,
FIG. 6b a longitudinal section through a detail of FIG. 6a,
FIG. 7 a perspective schematic view through the first embodiment.

FIG. 1 is an oblique view from below at the front of an embodiment of a float according to the invention. Only the purely pneumatic structure is shown here, without all the fastening and jointing parts. In the representation in FIG. 1 lines 1 appear, running along the float, which are more closely explained using FIG. 2. At somewhat half the length of the float can be seen a step 2 which—as is known—is provided for breaking away the flow of water. The bow of the float shown on the left in FIG. 1 has a front face 3, the stern on the right has a similar end surface 4.

FIG. 2 is a typical cross section through the float of FIG. 1, at roughly the position marked AA. An outer skin 5, comprising an airtight laminated low-stretch woven material is inflated with compressed air via a valve 21 and is maintained in the intended form by a multiplicity of webs 6, which are joined to the outer skin 5 essentially over its whole length. These joints can be created by sewing, gluing or welding. Where the webs 6 are joined to the outer skin 5 in the manner described the lines 1 mentioned in association with FIG. 1 arise, which extend essentially over the whole length of the float. The webs 6 can comprise woven textile or also foils; they divide the inner space of the float into chambers 7, which communicate with each other. To this end the webs 6 are not completely taken to the bow and stern end surfaces 3, 4 so that at least at the two ends of the float overflow hatches (not shown) are present. This is important especially with the use of airtight foils for the webs 6.

With the use of woven textiles for the webs 6 the air exchange between the chambers 7 is provided by the material. If a textile insert is used then the run of fibres of the weave is arranged parallel and perpendicular to the longitudinal axis of the float. It has also been shown to be advantageous to insert the woven textile in a double layer, whereby one layer is turned with respect to the other by about 45°. Thereby the webs 6 are in a position also when using woven textiles, to accept shear forces, which strongly increases the stiffness against bending and the stability of the shape of the float.

In the keel region in this first embodiment a keel rail 8 is attached, either by gluing or welding, which on the one hand improves the directional stability of the float, and on the other hand protects its bottom surface against damage. In a similar manner side rails 9 are attached at the transition of the bottom surface to the side walls of the float. Their purpose comprises as well as protection of the outer skin 5 the prevention of the so-called Coanda effect in water, and thus also cater for breaking away the flow. The keel rail 8 and the side rails 9 are preferably manufactured from plastics material.

The side rails 9 extend for instance only over the forward part of the float, that is from the bow to the step 2; the keel rail 8 extends similarly over the forward part of the float, but can however also be applied to the rear of the step 2.

With the number and density of the webs 6 shown in the drawing their direction is obtained by the application of osculating circles 10 as shown in FIG. 3. FIG. 3 is a section of FIG. 2.

In an intended overall contour 11 of the cross section the osculating circle 10 is inserted in such a manner that it touches the overall contour at predetermined first points 12. The second touching points 13 then are calculated for the overall contour 11 from elementary geometric considerations. The touching points 12, 13 of each osculating circle 10 are joined together and give the direction of the web 6 to be inserted here.

The actual contour of the cross section in the condition of the float when inflated with compressed air results from the equation of forces which is set up at each of the touching points 12, 13. This actual contour of the outer skin 5, as is shown in FIG. 2 and given the reference 14, comprises then the segments of the circles coming together at the touching points 12 and 13, whose radii are determined by the well known relationship $$R = \frac{\sigma}{\Delta p},$$

where

R=radius of curvature [m]

σ=circumferential tension in the outer skin 5 [N/m]

Δp=pressure difference interior-outside [N/m²]

Since, however, σ is proportional to Δp, from elementary physical derivation a value for R results which is dependent only on the geometry of the individual chambers 7 and on the order of magnitude of their half diagonals.

FIG. 4 shows a further feature according to the invention, again on the first embodiment. The outer skin 5 is, as already mentioned, made airtight and can be inflated with compressed air via valves for instance in the end surface 4. The entire float thereby is under pressure, the webs 6 are tensioned and take on the task of stiffening the float longitudinally, so that no additional stiffening means are necessary. For the eventuality only of a loss of pressure owing to local damage to the outer skin 5, flexible, elastic bladders 15 are inserted in the chambers 7 between the outer skin 5 and the webs 6, which under normal operation are pumped up to some 80–90% of the air pressure acting in the airtight outer skin 5. In normal operation therefore, these bladders perform no function.

If however a loss of pressure occurs within the outer skin 5, but outside the bladders 15, then the bladders lie against the walls of the chambers 7 and ensure that the statics of the float are essentially retained.

Each bladder 15 has its own valve 16; these are preferably similarly arranged on the end surface 4 and preferably configured as non-return valves. If one of these bladders springs a leak or is otherwise damaged then the remaining bladders 15 are not affected by it. These valves 16 are preferably taken to a manifold (not shown) for the even setting up of the pressure acting within the bladders 15.

It is shown in FIG. 5 that the shape of the cross section is not restricted to that shown in FIG. 2, 3, and 4. A twin keel float within the scope of the invention is shown here as a second embodiment. The overall contour 11 can be prescribed and is modified by the insertion of the webs 6 in accordance with the invention. An optimisation of the shape is possible by means of performing several such iterative stages.

A shape, such as is shown in FIG. 5 is superior to one according to FIG. 1 to 3 with regard to spray conditions. Owing to the relatively large inclination of the outer webs 6, stability about the horizontal cross axis is somewhat impaired, but that about the vertical cross axis is increased.

For directional stabilising in taxiing operation and as a protection against damage to the underside of the float, two keel rails 8 are provided here corresponding to its shape. The similarly present side rails 9 serve to suppress the Coanda effect which arises more strongly in this form of construction. Furthermore they undertake, as already mentioned earlier, a similar protection function against damage to the outer skin 5 at the sides.

FIG. 6*a* is a side view of the first embodiment of a float according to the invention, FIG. 6*b* a longitudinal section through the step 2, as indicated. The longitudinal section through the float shows here a continuous transition over the cross sectional tapering over the step, as is shown by the smooth flowing lines 1, shown dashed. In this way peaks of tension in the outer skin 5 and in the webs 6 due to bending forces on the float are avoided, which with a discontinuity would otherwise be unavoidable. The step 2 itself comprises for instance a plastics material shell 17 which is filled with a hard foam 18 and glued to the outer skin 5 under positive engagement. The plastics material shell 17 is further coated with a protective layer 19, which advantageously covers the whole of the underside of the float. Thereby a smooth transition is assured from the forward part of the float to the plastics material shell 17.

FIG. 7 shows the run of the webs 6 over the entire length of a float according to the first embodiment. Seven cross sectional surfaces 20 are drawn in, which however are of an irrelevant nature and in no way represent webs or other types of cross bulkhead, no matter of what type. It can be seen from FIG. 7 that the shape of the cross sectional surfaces 20 is essentially the same overall, only their sizes are different:

Departing from FIG. 7 the part of the float lying behind the step 2 can obviously also have a different shape of bottom—and therewith of the cross sectional surfaces 20—so long as the transitions of shape are smooth, taking into account the construction of the step 2 shown in FIG. 6*a, b*. This is for instance the case in the second embodiment of the float according to the invention, where the part lying behind the step 2 can also be constructed with a single keel. This especially taking into account the fact that the twin keeled construction only delivers its effectiveness in the forward part.

Constructions are known for the introduction of the static and dynamic loads from the aircraft onto the float and between the floats. There are flat or rod shaped structures, which extend over a large part of the length of the float and bind the two floats together. Such constructions are as mentioned, known or result in a similar manner from the construction to the task of distributing weight over the greatest possible surfaces. Such tasks present themselves generally wherever loads have to be introduced to textile and/or pneumatic components.

What is claimed is:

1. A pneumatic float for light and ultra-light aircraft, in which textile material and flexible webs are arranged running longitudinally inside the float, whereby chambers are divided off inside the float, into which airtight and flexible bladders are inserted, which can be inflated with compressed air, the float comprising:

an airtight and enclosed outer skin;

a plurality of flexible webs essentially running over an entire length of the float, the multiplicity of flexible webs being fastened to the outer skin over their entire length, wherein a position and placement of the webs is established such that, within an intended overall contour of a cross section through the float, osculating circles are inserted and two touching points of each osculating circle on an overall contour define attachment points of each web of the plurality of webs to the outer skin;

a plurality of intercommunicating chambers arising by the webs and the outer skin, each of the chambers comprising an airtight flexible bladder that can be inflated with compressed air;

at least one valve in the airtight outer skin, via which the float can be inflated with compressed air.

2. The pneumatic float of claim 1, wherein the webs comprise low-stretch textile material having runs of fibers arranged essentially parallel to and perpendicular to longitudinal axes of the float.

3. The pneumatic float of claim 2, wherein at least one of the webs comprises a double-walled construction, wherein the run of the fibers of a second layer of a textile material is turned by approximately 45° from a first layer thereof.

4. The pneumatic float of claim 1, wherein the webs comprise a plurality of low-stretch plastics foils.

5. The pneumatic float of claim 2, wherein the webs are fastened to the outer skin by sewing.

6. The pneumatic float of claim 3, wherein the webs are fastened to the outer skin by sewing.

7. The pneumatic float of claim 4, wherein the webs are fastened to the outer skin by sewing.

8. The pneumatic float of claim 2, wherein the webs are fastened to the outer skin by gluing.

9. The pneumatic float of claim 3, wherein the webs are fastened to the outer skin by gluing.

10. The pneumatic float of claim 4, wherein the webs are fastened to the outer skin by gluing.

11. The pneumatic float of claim 2, wherein the webs are fastened to the outer skin by welding.

12. The pneumatic float of claim 3, wherein the webs are fastened to the outer skin by welding.

13. The pneumatic float of claim 4, wherein the webs are fastened to the outer skin by welding.

14. The pneumatic float of claim 1, wherein the bladders comprise low-stretch airtight laminated textile material.

15. The pneumatic float of claim 1, wherein the bladders comprise an elastomer.

16. The pneumatic float of claim 14, wherein each bladder has a valve lying on the outer skin.

17. The pneumatic float of claim 15, wherein each bladder has a valve lying on the outer skin.

18. The pneumatic float of claim 16, wherein a working pressure in the bladders is 10–20% less than a pressure in the outer skin.

19. The pneumatic float of claim 17, wherein the working pressure in the bladders is 10–20% less than a pressure in the outer skin.

20. The pneumatic float of claim 1, wherein the outer skin is provided with a protective layer on at least a part of the float that enters the water.

21. The pneumatic float of claim 20, wherein the float comprises a forward art and a rear part, wherein a transition from the forward part to the rear part includes a step and wherein:

the webs within the float are shaped such that a greater cross-sectional surface forward of the step is translated continuously into a smaller cross-sectional surface behind the step; and the outer skin carries a plastics material shell, the shell forming the step, the step behind filled, the protective layer is taken over the step and also covers the plastics material shell.

22. The pneumatic float of claim 20, wherein the float carries at least one keel rail and two side rails.

23. The pneumatic float of claim 22, wherein the keel rails and the side rails comprise plastic material and are glued to the float.

* * * * *

UNITED STATES PATENT AND TRADEMARK OFFICE
CERTIFICATE OF CORRECTION

PATENT NO. : 6,499,420 B1
DATED : December 31, 2002
INVENTOR(S) : Frederick E. To et al.

It is certified that error appears in the above-identified patent and that said Letters Patent is hereby corrected as shown below:

Column 6,
Line 25, replace "forward art" with -- forward part --
Line 34, replace "step behind filled," with -- step being filled --
Line 40, replace "comprise plastic material" with -- comprise plastics material --

Signed and Sealed this

Tenth Day of August, 2004

JON W. DUDAS
*Acting Director of the United States Patent and Trademark Office*